United States Patent [19]

Schmidt

[11] Patent Number: 4,711,786

[45] Date of Patent: Dec. 8, 1987

[54] HIGH FIBER BREAD AND EXTRUDED PRODUCTS

[75] Inventor: Edward D. Schmidt, Minneapolis, Minn.

[73] Assignee: E.D.S. Company, Minneapolis, Minn.

[21] Appl. No.: 756,400

[22] Filed: Jul. 17, 1985

Related U.S. Application Data

[63] Continuation-in-part of Ser. No. 486,357, Apr. 19, 1983, abandoned.

[51] Int. Cl.⁴ .......................... A21D 2/00; A21D 8/02
[52] U.S. Cl. ........................................ 426/19; 426/21;
426/27; 426/629; 426/634; 426/653; 426/656;
426/549
[58] Field of Search ............... 426/19, 21, 27, 629, 426/634, 549, 653, 656

[56] References Cited

U.S. PATENT DOCUMENTS

| | | | |
|---|---|---|---|
| 4,022,919 | 5/1977 | Comer | 426/634 |
| 4,028,469 | 6/1977 | Kritchevsky et al. | 426/19 |
| 4,109,018 | 8/1978 | Thompson | 426/19 |
| 4,124,727 | 11/1978 | Rockland et al. | 426/634 |
| 4,237,170 | 12/1980 | Satin | 426/21 |
| 4,301,179 | 11/1981 | Schmidt | 426/19 |

FOREIGN PATENT DOCUMENTS

| | | | |
|---|---|---|---|
| 1048848 | 2/1979 | Canada | 426/21 |
| 0071841 | 2/1983 | European Pat. Off. | 426/19 |
| 0151869 | 11/1981 | German Democratic Rep. | 426/21 |
| 0201246 | 7/1983 | German Democratic Rep. | 426/19 |
| 0069843 | 6/1978 | Japan | 426/19 |
| 0867353 | 9/1981 | U.S.S.R. | 426/21 |

Primary Examiner—Christine M. Nucker
Attorney, Agent, or Firm—Clayton R. Johnson

[57] ABSTRACT

A high fiber bread or an extruded edible product that is made from a dough that includes wheat flour, pea flour and advantageously includes two or more of isolated pea protein, ground triticale hulls and ground pea hulls, or alternately includes wheat or various other cereal grain flours, ground triticale hulls and ground pea hulls with or without ground pea cotyledons.

28 Claims, No Drawings

HIGH FIBER BREAD AND EXTRUDED PRODUCTS

CROSS REFERENCE TO RELATED APPLICATIONS

This application is a continuation-in-part application of my application Ser. No. 486,357, filed Apr. 19, 1983, abandoned.

BACKGROUND OF THE INVENTION

This invention relates to high fiber content bread and extruded edible products.

After a review of the most recent research on nutrition, the USDA has published a report on "Dietary Guidelines for Americans" that recommends a diet: higher in fiber, lower in fat, saturated fat and cholesterol; that replaces simple carbohydrates (sugar) with complex carbohydrates (starch); and lower in sodium. "These suggestions are especially appropriate for people who have other risk factors for chronic diseases, such as family history of obesity, premature heart disease, diabetes, high blood pressure, high blood cholesterol levels, or for those who smoke."

Since the benefits of a high fiber diet alone are so numerous, reduces the risk of heart disease and strokes, reduces or eliminates the need for insulin by diabetics, reduces the risk of large bowel cancer, improves bowel functions, etc., the consumer is being encouraged to include foods higher in both crude and dietary fiber in their diets. There are an increasing number of high fiber foods and supplements being formulated and presented to the public. Very few of these fiber bases that meet the desired nutritional criteria have been found suitable for bread formulations. Not only has there been a problem encountered obtaining desired eating qualities, people will not eat bread for dietary purposes alone, but most fibers do such deleterious things as restrict volume and cut the dough during mixing stages of bread preparation or do not provide proper absorption. For example, it is common knowledge in the baking industry that even the ever popular whole wheat kernel has an acrid tasting aleurone layer that is removed with the fiberous hull; which is one of the reasons white flour was developed and maintains it popularity.

Even though it is old to fortify bread with protein supplements, a problem has been encountered in obtaining the desired excellent eating qualities. For example, supplementing the protein level in bread with soy flour or soy isolates adds nothing to the flavor and if anything tends to produce a product with a slight offtaste. Adding milk protein to bakery formulations at this point would add nothing unique to the flavor.

The consumer is looking for more natural type foods or foods void of chemical additives, such as mono and diglycerides, calcium sulfate, stearoyl 2 lactylate and L cysteine, required to make an acceptable loaf of bread following many bakery formulations. Those with lactose intolerence must have product free from milk based ingredients, e.g. whey, whey protein concentrate, nonfat dry milk, etc. Therefore, eliminating the need to add milk or milk replacers to improve crust color, boost protein levels, etc. is desirable in health oriented bakery products. And finally, bakers require a specialty type high fiber bread be reproducable.

There are many high fiber breads on the market today made from such things as whole wheat, flax seeds, microcrystalline cellulose (wood), etc. U.S. Pat. No. 4,237,170 to Satin discloses using yellow and green pea hulls to formulate a bread having the color, texture and flavor of white bread with the fiber and nutritional content of whole wheat bread. This was done through the addition of 5 to 20 parts by weight of pea hulls ground to a particle size that will pass through a 20–80 mesh screen inclusively. Satin found pea fiber ground to a smaller than 80 mesh screen size undesirable for bread making contributing an off color, aroma and flavor.

Moscow Food Ind. Inst. (U.S.S.R. Pat. No. 867,353) describes a method for hydrothermally treating (pre-cooking) peas to improve bread quality when the peas are added to bread formulations at the 5–20% level. Comer (U.S. Pat. No. 4,301,179) found the bitter flavor can be removed from pea flour by contacting the flour with steam. Both patents relate, in a broad sense, to the production and application of pea power.

Glabe (U.S. Pat. No. 3,573,061) describes a method whereby seed coats are washed with an acid, dried and ground to be added to bread to decrease the caloric content.

Tsantir (U.S. Pat. No. 3,767,423) developed a low calorie bread through the addition of a finely divided mixture of rice hulls and soy bran hull.

In U.S. Pat. 4,109,018 to Thompson, there is disclosed a low calorie bread made from a dough composition that per 100 parts by weight of wheat flour includes 3 to 9 parts of protein material selected from lowfat soy flour, nonfat dry milk, dried yeast flour and cottonseed fiber and 10 to 20 parts alpha cellulose flour. U.S. Pat. No. 4,301,179 to Schmidt discloses using a milk substitute in making bread that includes pea flour in the amount of 2% to 3% by weight of the wheat flour and sweet dairy whey.

Triticale, a cross between wheat and rye, after having been marketed for use in bread, snacks and other cereal based food items for over a decade, has failed to make an impact on the human food market despite the fact it combines many of the better characteristics of wheat and rye including high nutritional value and adaptability to adverse growing conditions. With reference thereto whole triticale flour (without separation of bran) has been mixed with wheat flour and also triticale flour with bran removed has been mixed with wheat flour to make bread, however such prior art efforts have not resulted in being able to prooduce a commerically acceptable bread.

Peas are available colored by chlorophyll (green) or xanthophyll (yellow). Succulent peas having been dried can be separated into the following fractions, each fraction having its own specific and differing characteristics:

Pea flour—whole peas ground
Pea powder—pea flour cooked
Ground pea cotyledons
Pea cell wall—a material extracted from inside the pea
Ground pea hulls—outer shell of the pea ground
Pea protein isolate
Pea starch Pea flour has been available to the baking industry for a decade or so, but to the best of applicants knowledge has not prior to applicants invention been successfully marketed for use in bakery items at above the 3% level because the flavor, texture, volume and aroma of the final product has not been acceptable to the consumer.

In order to minimize or overcome problems such as indicated above as well as to provide a premix that premits the production of bakery items that meet all the new dietary guidelines established by the U.S. Government, is versatile enough to make bread, rolls, buns, tea biscuits, croissants and almost any bakery item of this type as well as various extruded edible products and that contributes those organoleptic properties making the product acceptable to young and old alike, this invention has been made.

SUMMARY OF THE INVENTION

The present invention provides a bakery product (bread, buns, rolls, croissants and similar items) with excellent organoleptic properties as well as being higher in fiber than whole wheat bread and higher in protein than normally found in bakery items. The bakery product comprises flour, water, sugar, shortening, yeast and salt together with two or more of isolated pea protein, pea flour (or ground pea cotyledons), ground triticale hulls and ground pea hulls. A premix consisting of pea fiber and triticale fiber may be mixed with wheat flour and other ingredients to make high fiber bakery items or with wheat flour or various other types of cereal grain flours to make an extruded edible product such as a pasta, a snack product or a cereal product. One of the objects of this invention is to provide a bread product formulation that includes triticale bran for providing a good tasting bakery product.

Another of the objects of this invention is to provide bread/bun formulations that includes pea flour at higher than a 3% level together with pea bran and/or triticale bran for use in producing a final bread/bun product with a flavor, texture, volume and aroma that is generally acceptable to the consumer. Still another object of this invention is to provide bread/bun formulations that includes pea flour and/or isolated pea protein together with pea bran and/or triticale bran at levels and grinds to produce a loaf of bread/buns that have all of the attributes (volume, taste and texture) required for an enjoyable eating item.

A different object of this invention is to provide new and novel food formulations for making products such as bakery products, pasta, and extruded snack and cereal products that are high in fiber, yet have unique organoleptic properties that make the product acceptable to young and old alike. In furtherance of the last mentioned object, it is another object of this invention to provide a premix used in making several products that have a shelf life of about two years or more without the use of artificial preservatives to permit the accumulation and storage of the premix for an extended period of time. Additionally, it is an object of the invention to provide a new and novel formulation for making bakery goods, pasta and other extruded snack and cereal products that have a good shelf life without the addition of additives or preservatives.

Another object of this invention is to provide and new and novel formulation for making bakery goods, pasta and extruded snack and cereal products that includes fiber from each of a cereal grain and a legume source that are combined in a manner that one bran provides a good clean flavor enhanced by the other bran. In furtherance of this last mentioned object, it is still another object of the invention to provide a formulation for making bakery products that have a pleasant flavor while using a reduced level of salt for making such products, or no salt.

An additional object of this invention is to provide a new and novel high fiber premix that can be readily applied by the average baker using any method commonly used to make standard bread items (bread, rolls, buns, croissants, etc.) providing the baker with above average machinability. With reference to the last mentioned object is another object of this invention to provide bread products high in fiber (higher than most whole wheat breads) with a smoother texture, and a texture similar to white bread as opposed to a bread product with a granular texture similar to whole wheat.

With reference to both of the embodiments of the invention, none of the pea fractions nor the peas from which they have been separated are subjected to a hydrothermic treatment.

DESCRIPTION OF THE INVENTION

First Embodiment

Applicant has developed a formulation for non-white specialty bread that contains fiber from either one or both of pea bran and triticale bran, and pea flour and may contain isolated pea protein that when added in the selected proportion and grind sizes produces a loaf of bread or buns with excellent organoleptic properties as well as being higher in fiber than whole wheat bread, having high quality protein and has excellent toastability. By utilizing wheat flour which is high in the amino acid methionine but low in amino acid lysine and pea flour (and/or pea protein isolate) which is low in the amino acid methionine but high in the amino acid lysine, there has been obtained a bakery product having protein of a higher quality than found in either of the wheat or pea pulses.

Screen sizes of the fiber fraction (triticale or pea) used in the bread formulation of the first embodiment of the invention is as follows:

| U.S. STANDARD MESH | PEA FIBER | | TRITICALE FIBER |
| --- | --- | --- | --- |
| −30 | 11% | | 13.2% |
| −50 | 53.7 | | 39.3 |
| −70 | 15.3 | | 20.3 |
| −100 | 8.0 | | 15.2 |
| −200 | 8.6 | | 10.8 |
| −325 | 2.4 | +200 | 1.2 |
| +325 | 1.0 | | |
| | 100.0% | | 100.0% |

The difference in size distribution between pea and triticale fibers reflect the difference between milling systems. The triticale hulls were milled in Canada while the pea hulls were milled in the Minneapolis, Minn. area. The two grinds for all practical purposes are the same. While the general maximum and minimum mesh sizes used should remain constant, the spread can vary somewhat. The hulls required for the bread/bun product of the first embodiment are ground so that all the fiber to be used passes through a 16 mesh screen and at least about 20% of each of the pea hulls and triticale hulls passes through an 80 mesh screen. The pea hulls from either green or yellow peas can be used.

The preferred screen size for the pea flour used in the bread/bun formulation is as follows:

| U.S. STANDARD MESH | PERCENT |
| --- | --- |
| −30 | .2–1 |
| −50 | 2.8–2.5 |
| −70 | 6.2–6.1 |
| −100 | 9.6–8.2 |

| U.S. STANDARD MESH | PERCENT |     |
|---|---|---|
| −140 | 10.2−9.4 |     |
| −200 | 7.0−7.9 |     |
| −325 | 8.4−6.4 |     |
| +325 | 55.6−58.5 |     |
|  | 100 | 100 |

The pea flour is added as a flavor enhancer and a processing aid which improves machinability by mellowing the dough. The pea flour helps counteract the effect of loading the bread with fiber which is an inert material that adversely effects machinability.

Further, the pea flour which has about 24% pea protein, raises the protein quality of the bread.

Advantageously, isolate pea protein can be added primarily to boost the protein level of the bread. Desirably, the screen size for the isolated protein is desirably 100% through a 60 mesh screen.

Examples of pre-mixes of the first embodiment that may be advantageously used to produce a desirable loaf of bread consist of ingredients as follows:

| PRE-MIX I | |
|---|---|
| Pea hulls (ground as specified herein) | 46.7% |
| Pea flour (ground as specified herein) | 46.7% |
| Isolated pea protein | 6.6% |
| PRE-MIX II | |
| Pea hulls (ground as specified herein) | 50% |
| Pea flour (ground as specified herein) | 50% |
| PRE-MIX III | |
| Ground pea hulls (ground as specified herein) | 40%−0 |
| Ground triticale hulls (ground as specified herein) | 25%−65% |
| Pea Flour (ground as specified herein) | 35% |
| PRE-MIX IV | |
| Ground pea hulls (ground as specified herein) | 37%−0 |
| Ground triticale hulls (ground as specified herein) | 23%−60% |
| Pea flour (ground as specified herein) | 32.3% |
| Pea protein isolate (ground as specified herein) | 7.7% |
| PRE-MIX V | |
| Ground triticale hulls (ground as specified herein) | 83%−87% |
| Pea flour (ground as specified herein) | 17%−13% |
| PRE-MIX VI | |
| Ground triticale hulls (ground as specified herein) | 75%−81% |
| Pea flour (ground as specified herein) | 17%−13% |
| Pea protein isolate (ground as specified herein) | 8%−6% |

Advantageously, the protein of Pre-mix IV is isolated pea protein. A typical bread formulation using any one of the above pre-mixes is as follows:

| BREAD FORMULATION I | | |
|---|---|---|
| Wheat flour | 100% | 100% |
| Water | 55.0% | Flour basis |
| Sugar | 11.5% | Flour basis |
| Shortening | 3.75% | Flour basis |
| Pre-mix | 12−15% | Flour basis |
| Yeast | 3.75% | Flour basis |
| Salt | 2.5% | Flour basis |

Product is now being sold as a full mix, minus water, shortening and yeast.

Even though any one of the pre-mixes I–VI can be used in the above formula advantageously, the level of Pre-mix I would be about 15%, Pre-mix II about 14%, Pre-mix III would be about 12%. Pre-mix IV about 13%, Pre-mix V about 12% and Pre-mix VI about 15%. Pre-mixes III and IV, on the basis of taste and color, are better mixes.

On a wheat flour basis the mixture of pea and triticale hull fibers used is in a range of about 0 to 6 parts by weight of pea hull fibers and 2.76 to 9.75 parts triticale hull fibers and the mixture is at least about 7.2 parts by weight while the pea flour in such a mixture is at least about 3.9 parts by weight. Desirably Pre-mixes III and IV each include at least about 37% of pea hull fibers (4.8 parts by weight on a flour basis).

In mixtures V and VI advantageously triticale hull fibers in the amount of at least 9 parts by weight per 100 parts of wheat flour are used.

While in depth storage tests have not been conducted, it has been found that buns baked using the above formulation have remained in an edible condition (mold, staling, etc.) for 12 days while conventional bakery items remain edible for 7 days.

Variations may be made in the above formulation as follows:

1. Gluten content of the bread flour may be varied, or
2. Vital wheat gluten may be added to the formulation, and
3. Bleached, enriched or plain wheat white flour or variations thereof may be used, and
4. The amount of water added, depending upon the absorption of the flour, etc.
5. Amount of shortening added varies, depending upon whether bread, rolls or buns are baked.

The pre-mixes of the first embodiment are more conducive to the addition of all natural ingredients, and clashes with some processed ingredient additions. For example pea flour, will not tolerate the addition of L-Cysteine which would result in the bread not maturing. However, the baker may make normal adjustments in the formulation such as the use of mold inhibitors, yeast food and nonfat dry milk without changing the final product.

Non-wheat flours, other than those above indicated may not be added to the above formulations less the taste and structure of the final product would be adversely affected.

The pre-mixes of the first embodiment may be used in the formulation of breads, rolls or buns using the sponge dough, straight dough, continuous mix methods for making bread or variations thereof.

In accordance with the first embodiment there has been obtained a bakery product having a higher than 3% pea flour level that is acceptable to the public, both children and adults. Further the product has excellent toastability, and is relatively high in protein and fiber.

Second Embodiment

A second embodiment of the premix of this invention that can be used in making non-white bread bakery items such as a loaf of bread, buns, rolls and etc. having excellent organoleptic properties as well as being higher in crude and dietary fiber than whole wheat bread which may use, but does not require the use of, pea flour to obtain such results is a combination of pea bran (fiber), triticale bran (fiber) and (on occasion) ground pea cotyledons used in the preferred proportion and grind sizes set forth hereinafter. The milled triticale bran provides the basic nutty flavor while the milled pea fibers provide the desired flavor enhancement and aroma.

Other fiber sources evaluated in my studies and other laboratories have not resulted in the development of bread products of the quality achieved combining pea and triticale. Sources evaluated, alone and combined, include barley bran, corn bran, oat bran, apple fiber, rice hulls, sugar beet pulp, bean hulls, pineapple fiber and processed wood pulp (alpha and powdered cellulose).

To boost protein quality, improve dough machinability and lighten the color of the product, ground pea cotyledons may be added to the second embodiment premix. Pea flour and/or ground pea cotyledons mellows dough probably due to the presence of protease and lightens the color of the dough probably due to the presence of lipoxidase. It is common knowledge wheat flour is high in the amino acid methionine but low in the amino acid lysine while pea flour is high in lysine and low in methionine; combining the two results in a finished product with a higher quality protein found in either.

Best results have been obtained with a weight ratio of about 2.5/1 (pea hulls/triticale bran) added to the bakery formulations at a rate of 10.4% on a flour basis. The greater the variation from the ratio and rate of the preceeding sentence the less desirable the product becomes. Limits for an acceptable product are about ½ to 6/1 (pea hulls/triticale bran) added at a rate varying from 5-32%. These ratios were based on pea fiber containing about 38% crude fiber and triticale bran containing about 9% crude fiber. Crude fiber content is being used for reference purposes because the procedure for determining crude fiber has been available for some time now and is universally accepted, while dietary fiber determination techniques have been undergoing revisions. Fiber yield, which varies from crop to crop and/or is dependent upon the efficiency of the system milling and separating the bran and hulls, must be kept constant from batch to batch to reproduce the bakery items covered by this invention.

Preferred screen sizes for the pea hull fractions, triticale bran and pea cotyledons to be added to the second embodiment bread formulation are as follows:

| Pea fiber - 100% of the pea hulls ground fine enough to pass through an 80 mesh screen. | |
| --- | --- |
| Triticale fiber | |
| % on a U.S. Standard 20 mesh screen | 4.9% |
| % on a U.S. Standard 30 mesh screen | 14.5 |
| % on a U.S. Standard 70 mesh screen | 46.4 |
| % on a U.S. Standard 100 mesh screen | 29.0 |
| % on a U.S. Standard 200 mesh screen | 4.2 |
| % thru a U.S. Standard 200 mesh screen | 1.0 |

While particle sizes should be within the 20-200 mesh range, the spread may, will, vary depending upon the mill used. While the above general spread is considered ideal, reasonable variations are still acceptable for the second embodiment of this invention.

The preferred range screen sizes for the ground pea cotyledon if included, in the second embodiment of the premix, are as follows:

| − + U.S. Standard mesh screen | .2 |
| --- | --- |
| −50 U.S. Standard mesh screen | 2.8 |
| −70 U.S. Standard mesh screen | 6.2 |
| −100 U.S. Standard mesh screen | 9.6 |
| −200 U.S. Standard mesh screen | 17.2 |
| −325 U.S. Standard mesh screen | 8.4 |
| +325 U.S. Standard mesh screen | 55.6 |

It is recommended the pea hulls and triticale bran, ground as specified above for the second embodiment, be blended into a premix, 71% pea fiber and 29% triticale fiber (by weight), and premix added at about the 10.5% level to the bakery products. An ideal bread formula would be as follows:

| BREAD FORMULATION II | |
| --- | --- |
| Wheat flour | 100% |
| Water | 68%* |
| Sugar | 11.5%* |
| Premix | 10.5%* |
| Vegetable shortening | 4.0%* |
| Yeast | 4.0%* |
| Salt | 2.5%* |

*flour basis

An ideal salt-free bread formula would be:

| BREAD FORMULATION III | |
| --- | --- |
| Wheat flour | 100% |
| Water | 68%* |
| Sugar | 11.5%* |
| Premix | 10.5%* |
| Vegetable shortening | 4.0%* |
| Yeast | 4.0%* |

*flour basis

An ideal bread formulation that includes pea cotyledons would be:

| BREAD FORMULATION IV | |
| --- | --- |
| Wheat flour | 100% |
| Water | 68%* |
| Sugar | 11.5%* |
| Premix | 10.5%* |
| Pea cotyledons | 2-3%* |
| Vegetable shortening | 4.0%* |
| Yeast | 4.0%* |
| Salt | 2.5%* |

*flour basis

The premix referred to in each of Bread Formulations II, III and IV is a premix of the second embodiment that does not include pea flour, and other than for formulation IV does not include pea cotyledons. However, it is to be noted that pea flour may be included as parts of the formulations II, III and IV.

Reasonable variations that may be made in the above bread formulations of the second embodiment while still being able to obtain satisfactory results include:

1. Gluten content of the bread flour may be varied.
2. Bleached, enriched or plain wheat flour or variation thereof may be used.
3. Vital wheat fluten may be added to the formulation.
4. Amount of water added may be varied, depending upon the absorption of the flour, etc.
5. Amount of vegetable shortening added varied, depending upon whether bread, rolls or buns are baked.
6. Amount of sugar added adjusted to suit personal preferences.
7. Amount of yeast varied depending upon the type of yeast added, e.g. instant, cake, etc. and whether the bread is baked immediately after the dough is mixed or stored frozen to be baked at a later date.
8. While it is preferred the premix be added to all natural ingredients, the addition of "chemical" additives such as L cysteine, mono and diglycides not only clashes with the spirit of the baked product of this invention but leads to, in most instances, loss of product quality. However, while not recommended, the baker may make adjustments in the formula such as the addition of mold inhibitors.

It should be pointed out that the studies I conducted to determine limits for the addition of ground pea hulls and triticale bran, as described above, included the addition to Bread Formulation II of:

Ground pea hulls at the 10.4% level replacing the premix in one batch.

Ground pea hulls at the 7.4% level replacing the premix in the second batch.

Ground triticale bran at the 3% level replacing the premix in a third batch.

Ground triticale bran at the 10.4% level replacing the premix in a fourth batch.

Bread made from each of the four batches and was of a poorer quality than that obtained by mixing the 2.5/1 pea fiber-triticale fiber blend. Further product made from all four batches were substantially different in taste, color and texture from that wherein the 2.5/1 pea hull/triticale bran was used.

Dough prepared from the above Bread Formulations is one that can be formed into bread, rolls and stored frozen to be proofed and baked at a later date. Modifications normally made in frozen dough formulations such as adding an oxidizing agent, may be made prior to freezing the dough while still keeping within the spirit of this invention.

Baked bread products prepared from the second embodiment premix maintains excellent eating qualities after being stored frozen for reasonable lengths of time (one year).

While the 2.5/1 blend of pea fiber/triticale bran was developed primarily for use in bakery items, it has been found that this blend can be used in other milled and processed cereal grain items such as high pressure extruded items (cereals and snacks) and low pressure extruded items (pasta and macaroni). The blend provides a functional and workable addition to these formulations as well as providing finished products, or with uniquely pleasant textures and flavors, that meet the U.S. dietary guidelines. Tests indicate that preferable the fiber blend be added to extruded items in approximately the same range recommended for bakery items e.g. 5–32% of the 2.5/1 pea fiber/triticale mix with 10.5% being preferred. The ratio of pea fiber to triticale bran may be within the range of 1:2 to 6:1. Keeping with the food industry standards, bakery formulas are reported here in baker's percentages while formulations for extruded items are reported on a straight percentage basis. Therefore, the following formulas do contain the same amount of fiber blend as the bakery items on a pound for pound basis. The numbers differ because they refer to a different base.

| IDEAL PASTA FORMULA |
|---|
| 67.5% semolina |
| 26.4% water |
| 6.1% 2.5/1 blend of pea fiber/triticale bran |
| Range for pasta: 3–15.5% 1:2–6:1 ratio |

| IDEAL SNACK OR CEREAL FORMULA |
|---|
| 67.5% corn flour |
| 26.4% water |
| 6.1% 2.5/1 blend of pea fiber/triticale bran |

| IDEAL SNACK OR CEREAL FORMULA -continued |
|---|
| Range for snack/cereal formulation: 3–15% 1:2–6:1 ratio |

Amount of water added to the extruded items will vary depending upon the absorption of the ingredients, extruder settings and make of the extruder. The flavor added to the finished product will determine its use as a breakfast cereal (for example fruit) or snack (for example nacho cheese).

It is to be noted that cereal grain flours other than semolina and corn flour may be used. Further it is to be noted that pea flour can be added to the formulations for extruded cereal grain based products.

A loaf of bread made using a premix of 2.5/1 pea hulls/triticale bran in Bread Formulation II had excellent organoleptic properties and was higher in crude and dietary fiber than whole wheat bread as shown below for a two ounce serving of each.

|  | CRUDE FIBER | DIETARY FIBER |
|---|---|---|
| WHOLE WHEAT BREAD | .9 | 4.2 |
| FIBERICH LITE | 1.7 | 8.7 |

Further it has been found that in making one batch of bread wherein pea fibers were used in combination with whole triticale flour (without separating bran) and a second batch triticale bran was mixed with pea fibers so that each batch had the same level of bran, in so far as taste and texture were concerned two completely different products were obtained. Much better results were obtained with the second batch than with the first batch.

In making tests to determine if finely ground pea hulls (below 80 mesh screen size) enhanced the fiber of other grain cereals in making a non-white wheat bread, I found that while ground pea hulls added at a level of 7.5 parts per 100 parts of wheat flour did enhance other brans such as barley, oats and corn, but I did not find any that showed the compatability of pea hulls and triticale bran so far as making non-white wheat bread was concerned.

What is claimed is:

1. A composition for making high fiber content edible products, comprising 100 parts by weight of a cereal grain flour and a premix that includes about 5 to 32 parts by weight of pea hull fibers and triticale hull fibers with the ratio of pea hull fibers to triticale fibers being in the range of about ½ to 6/1.

2. The composition of claim 1 wherein it is for making bread, the premix is in an amount of about 12 to 15 parts by weight and consists of pea flour and said pea fibers and triticale fibers, the pea flour being in an amount of at least about 32.3% by weight of the premix, the pea hull fibers being in an amount of at least about 37% by weight of the premix, and the triticale fibers being at least about 23% the premix.

3. The composition of claim 1 further characterized in that both the pea hull fibers and triticale fibers are of sizes that all will pass through a 16 mesh screen and at least 20% will pass through an 80 mesh screen.

4. The composition of claim 1 wherein at least a major portion of the pea hull fibers are of sizes to pass through an 80 mesh screen.

5. The composition of claim 1 wherein at least about 100% of the pea hull fibers will pass through an 80 mesh screen.

6. The composition of claim 5 wherein at least most of the triticale fibers are of a size to pass through a 20 mesh screen, the pea hull fibers to triticale ratio is about 2.5:1, and the premix is about 10.4 parts.

7. A method of making an edible cereal grain based product having a high fiber content that include bakery goods and extruded goods, the step of forming a dough by combining dough ingredients which include a cereal grain flour, water, pea hull fibers and triticale hull fibers with the ratio of pea fiber to triticale fiber being within the range of about 1:2 to 6:1 and the weight of the combination of pea hull fibers and triticale fibers being at least about 5 parts to 100 parts of flour.

8. The method of claim 7 wherein all of the pea hull and triticale fibers are of size to pass through a 16 mesh screen and at least 20% of each will pass through an 80 mesh screen.

9. The method of claim 7 wherein flour is wheat flour and the dough is shaped and baked to form a bread product.

10. The method of claim 7 wherein the flour is either a corn flour or a semolina flour, and after the dough is made it is extruded.

11. The method of claim 7 wherein the pea hull fibers are of a size that at least a major portion of them will pass through an 80 mesh screen.

12. The method of claim 7 wherein all the pea hull fibers will pass through an 80 mesh screen and that at least substantially all the triticale fibers will pass through a 20 mesh screen.

13. A bread product dough comprising wheat flour, water, a leavening agent, sugar, shorting pea hull fibers and triticale fibers, the weight of pea and triticale fibers being about 5 to 32 parts by weight per 100 parts of flour and the ratio of pea fibers to triticale fibers being in the range of about 1:2 to 6:1.

14. An extruded edible product such as pasta, cereal and snack goods comprising a cereal grain flour, water, pea hull fibers and triticale fibers, the weight of pea hull fibers and triticale fibers being about 5 to 32 parts be weight per 100 parts of flour and the ratio of pea fibers to triticale fibers being within the ratio of about 1:2 to 6:1.

15. The product of claim 14 wherein the product is pasta and its cereal grain flour is semolina.

16. A composition for making a high fiber content bread, comprising 100 parts by weight wheat flour and about 12 to 15 parts by weight of a premix that includes pea flour and pea hull fibers wherein substantially all of the pea hull fibers will pass through a 16 mesh screen and at least about 20% will pass through an 80 mesh screen and the pea hull fibers are of at least about 4.4 parts by weight per 100 parts of wheat flour.

17. The composition of claim 16 wherein the premix contains about 23% to 65% triticale fibers and that the pea flour is in an amount of at least about 13% by weight of the premix.

18. The composition of claim 16 wherein the pea flour in the premix is in an amount to provide at least about 3.9 parts by weight on a flour basis.

19. The composition of claim 16 wherein the premix includes at least about 37% by weight of pea hull fibers on a premix basis.

20. The composition of claim 16 wherein the amount of triticale fibers in the premix is at least about 2.76 parts per 100 parts of wheat flour.

21. The composition of claim 16 wherein substantially all of the pea hull fibers will pass through a 80 mesh screen.

22. The composition of claim 21, wherein the amount of triticale hull fibers in the premix is at least about 2.76 parts per 100 parts of wheat flour.

23. The composition of claim 21 wherein the amount of pea flour in the premix is of at least about 3.9 parts by weight per 100 parts of wheat flour.

24. A method of making a bakery product having a high fiber content comprising the step of forming a dough by combining bakery ingredients including wheat flour, water, sugar, a leavening agent, pea flour and pea hull fibers, substantially all of the pea hull fibers being of a size to pass through a 16 mesh screen and at least 20% of a size to pass through a 80 mesh screen, and the amount of pea hull fibers being in an amount of at least 4.4 parts per 100 parts of wheat flour.

25. The method of claim 24 wherein the bakery ingredients include triticale hull fibers in an amount of at least about 2.76 parts by weight per 100 parts of wheat flour.

26. The method of claim 25 wherein the weight ratio of pea hull fibers to triticale hull fibers is about 2.5/1 and the amount of pea hull and triticale is about 10.4% on a weight flour basis.

27. The method of claim 24 wherein the pea flour is in an amount of at least 3.9 parts by weight per 100 parts of weight flour.

28. The method of claim 27 wherein substantially all of the pea hull fibers are of a size to pass through a 80 mesh screen.

* * * * *